United States Patent
Li et al.

(10) Patent No.: US 8,295,606 B2
(45) Date of Patent: Oct. 23, 2012

(54) DEVICE AND METHOD FOR DETECTING SHADOW IN IMAGE

(75) Inventors: Tao Li, Beijing (CN); Xun Yuan, Beijing (CN); Gang Wang, Beijing (CN); Zhongchao Shi, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 441 days.

(21) Appl. No.: 12/656,586

(22) Filed: Feb. 4, 2010

(65) Prior Publication Data

US 2010/0232705 A1  Sep. 16, 2010

(30) Foreign Application Priority Data

Mar. 12, 2009 (CN) .......................... 2009 1 0126541

(51) Int. Cl.
*G06K 9/62* (2006.01)

(52) U.S. Cl. ........ 382/195; 382/224; 382/168; 382/190; 348/169

(58) Field of Classification Search ................... 392/195, 392/224, 168, 190, 103, 199; 348/169
See application file for complete search history.

(56) References Cited

U.S. PATENT DOCUMENTS

| | | |
|---|---|---|
| 7,305,127 B2 | 12/2007 | Wells |
| 7,639,878 B2 | 12/2009 | Ibrahim et al. |
| 2005/0212794 A1* | 9/2005 | Furukawa et al. ............ 345/419 |
| 2007/0110309 A1 | 5/2007 | Ibrahim et al. |
| 2011/0273620 A1* | 11/2011 | Berkovich et al. ............ 348/584 |

OTHER PUBLICATIONS

Chinese Version of V. Vapnik, "The Nature of Statistical Learning Theory", Spring-Verlag, New York, 1995, and partial English translation thereof.

* cited by examiner

*Primary Examiner* — Matthew Bella
*Assistant Examiner* — Ruiping Li
(74) *Attorney, Agent, or Firm* — Harness, Dickey & Pierce, P.L.C.

(57) ABSTRACT

A device for detecting a shadow region in an image includes an imaging module generating a multi-channel image including brightness, red, green, and blue channels, a brightness correcting module correcting values of the brightness channel based on imaging parameters and outputting a corrected multi-channel image, a scene classifying module determining to carry out a shadow detection on the corrected multi-channel image, a shadow detecting module classifying pixels of the corrected multi-channel image into a shadow or non-shadow pixel, and generating a shadow classification mark matrix having pixels having a shadow classification mark value corresponding to the classification, a region segmentation module segmenting the multi-channel image into regions having pixels having similar color values, and generating a region mark matrix having pixels having a region mark value, and a post-processing module updating the shadow classification mark matrix based on the shadow classification mark matrix and region mark matrix.

18 Claims, 14 Drawing Sheets

FIG.3

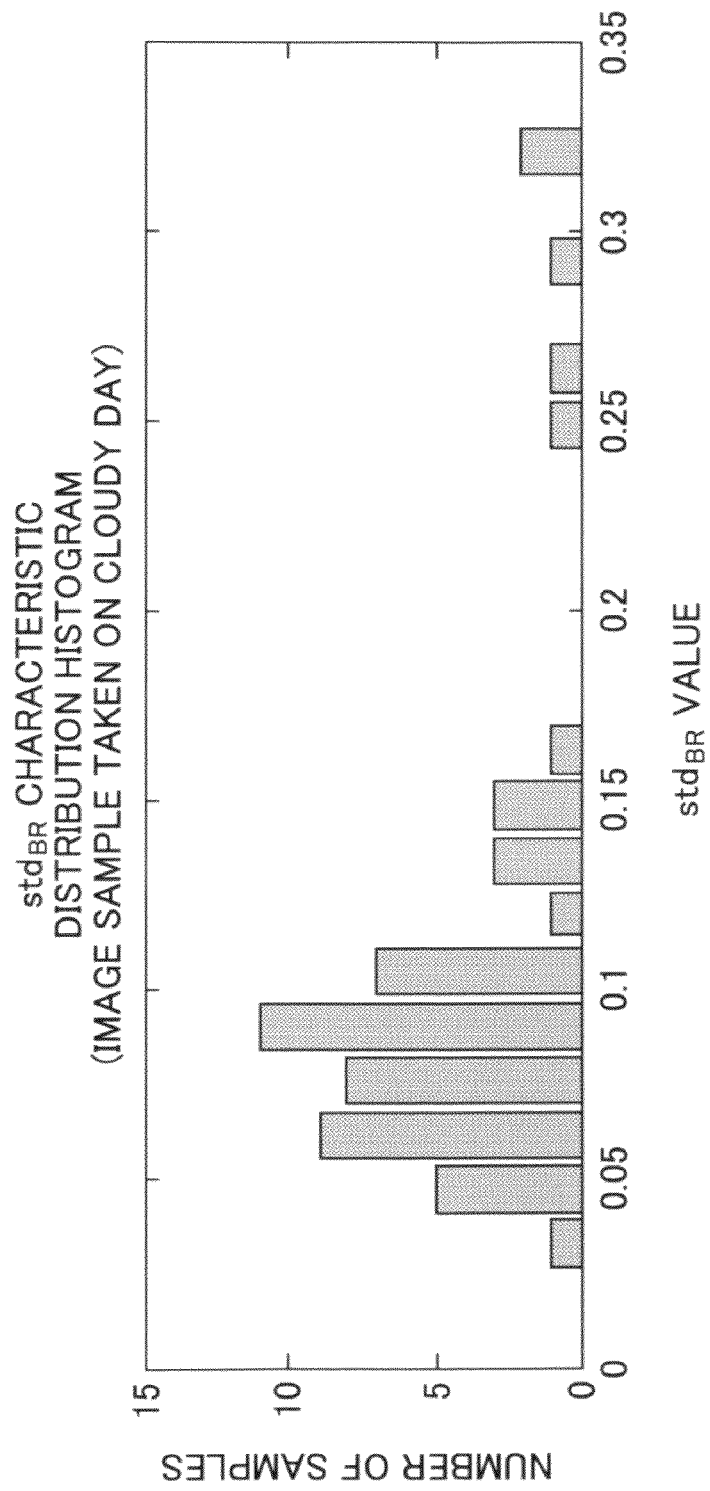

FIG.10

STEP 1. Prepare an n*n (16*16) element-matrix M, and initialize elements of 16*16 matrix M to zero: i.e., M(ij)=0; input brightness channel matrix $L_c$
STEP 2. Prepare void stack S.
STEP 3. Apply x=0, y=0, c=0. set threshold d.
STEP 4. If M(x,y)=0,
    STEP 4.1 C=C+1, M(x,y)=C.
    STEP 4.2 S.push(x,y).
    STEP 4.3 If S is void, go to step S5; otherwise $(x_0,y_0)$=S.pop().
    STEP 4.4 Select eight adjacent pixels$(x_i,y_i)$(i=1...8) adjacent to pixel$(x_0,y_0)$=0,
        STEP 4.4.1 If M$(x_i,y_i)$!=0, go to step S4.5
        STEP 4.4.2 If absolute value of difference between $L_c(x_0,y_0)$ and $L_c(x_i,y_i)$ is smaller than d, M$(x_i,y_i)$=C; S.push$(x_i,y_i)$.
    STEP 4.5 Go to step 4.3.
STEP 5. C=C+1
STEP 6. x=x+1.
STEP 7. If x≥n, x=0, y=y+1; otherwise go to step S4.
STEP 8. If y≥n, exit; otherwise go to step S4.

| 0 | 1 | 0 | 1 | 1 | 1 | 1 |
| 1 | 0 | 0 | 1 | 0 | 1 | 1 |
| 1 | 0 | 0 | 1 | 1 | 1 | 1 |
| 0 | 1 | 0 | 1 | 1 | 1 | 0 |
| 0 | 1 | 0 | 0 | 1 | 0 | 1 |

FIG.12C

| 0 | 1 | 1 | 1 | 1 | 1 | 1 |
|---|---|---|---|---|---|---|
| 0 | 0 | 0 | 1 | 1 | 1 | 1 |
| 0 | 0 | 0 | 1 | 1 | 1 | 1 |
| 0 | 0 | 0 | 1 | 1 | 1 | 1 |
| 0 | 0 | 0 | 1 | 1 | 1 | 1 |

DEVICE AND METHOD FOR DETECTING SHADOW IN IMAGE

BACKGROUND OF THE INVENTION

1. Field of the Invention

The invention generally relates to a device and a method for processing images, more specifically to a device and a method for automatically detecting a shadow in a supplied image, and also to a device and method for segmenting a supplied image into a shadow region and a non-shadow region.

2. Description of the Related Art

In a technical field of the color image analysis, segmenting an image into a shadow region and a non-shadow region or detection of the shadow region plays an important role, especially in white balance processing and exposure compensation processing in cameras. In the related art white balance processing, color is adjusted for an entire image; however, with this method, objects in shadows frequently appear to have blue casts. However, when photographing human subjects, the blue casts in human faces are generally considered unsightly and undesirable. Accordingly, attempts have been made to provide a technology to detect a shadow region of images in advance and provide different white balance parameters for a shadow region and for a non-shadow region, so that the blue casts may be prevented from appearing in photographed images of human subjects.

U.S. patent application serial number 2007/0110309A1 discloses a technology to detect shadows in images. In this technology, one or more images containing shadows are compared to reference images that are void of the shadows, and ratios are calculated between pixel pairs of the images. The pixels having the calculated ratios that fall within a predetermined range are detected as having shadows. However, in photographing or imaging subjects with a camera, it may be difficult for a user to provide reference images that are void of the shadows corresponding to all the scenes the user desires to take images of.

Further, U.S. Pat. No. 7,305,127 B2 discloses a technology to detect shadows in HSV color space properties, that is, hue (H), saturation (S), and brightness (V). This technology is devised based on the following hypothesis. According to U.S. Pat. No. 7,305,127 B2, in the H/S (ratio of hue to saturation) histogram, the valley of the H/S histogram indicating a near position of the value of 1 corresponds to a border between pixels in a shadow region and those in a non-shadow region of an image. The values located on the left of the boundary line of the histogram correspond to the pixels in the shadow region and the values located on the right of the boundary line of the histogram correspond to the pixels in the non-shadow region of the image. Likewise, in the S/V (ratio of saturation and brightness) histogram, the peak of the S/V histogram indicating a near position of the value of 1 corresponds to a border between pixels in the shadow region and those in the non-shadow region of the image. The values located on the left of the boundary line of the histogram correspond to the pixels in the non-shadow region and the values located on the right of the boundary line of the histogram correspond to the pixels in the shadow region of the image. However, such a hypothesis may not be supported if images are composed of complex scenes.

A pixel value of the image is a product of the light intensity and the reflectance of positions corresponding to the pixels. If x and y respectively represent horizontal and vertical coordinates, I(x, y) represents the pixel value of the pixels, and S(x, y) and R(x, y) respectively represent the light intensity and the reflectance of the pixels of the shadow region of the image, the relationship between I(x, y), S(x, y), and R(x, y) is represented by the following equation (1).

$$I(x,y)=S(x,y)\times R(x,y) \qquad (1)$$

In equation (1), an analytical value of light intensity S of the shadow region of the image may not be obtained from the supplied image I alone. Thus, according to equation (1), shadows may not be detected, in theory. However, the shadow region of the image can be discriminated with the naked eye, which means that some characteristic by which the shadow region is identifiable still exists in the image.

Notice that the white balance processing may be required to be carried out in real time with shadow detection. Accordingly, a shadow region and a non-shadow region of an image are discriminated based on color characteristics in the image. The shadow detection may particularly be effective when the density of the shadow is significant. That is, an image taken on a sunny day has a significant contrast between a shadow region and a non-shadow region of the image. By contrast, an image taken on a cloudy day has insignificant contrast between the shadow region and the non-shadow region of the image. Accordingly, the image taken on a cloudy day need not be divided into two regions in order to independently carry out white balance processing on the two regions. Examples of such two regions (i.e., shadow and non-shadow regions) may include an image taken on a sunny day and an image taken on a cloudy/rainy day; however, examples may include images taken on a variety of scenes such as an image taken indoor and an image taken outdoor.

Below, the images taken outdoor are described in more detail. The embodiments of the present invention disclose a novel and useful technology to detect shadows utilized in digital cameras. As mentioned above, in theory, the analytical value of light intensity of the shadow region of the image may not be obtained from the supplied image alone. However, statistically speaking, shadows may be identifiable to some extent based on their characteristics. An example of such characteristics may be darkness. Accordingly, in the following embodiments, a shadow detection method is devised based on a machine learning approach.

First, distributions of two types of image samples, namely, shadow image samples and non-shadow image samples are analyzed, and a collection of color characteristics based on which shadow pixels and non-shadow pixels can be identifiable is obtained. The collection of color characteristics includes brightness, saturation, and a ratio of a blue amount and a red amount in an RGB color space. Next, a classifier is created based on groups of image samples collected in advance. Elements supplied to the classifier may be unique vectors including values of the collection of color characteristics. The classifier may be configured to output attribute values (e.g., shadow and non-shadow). If an image contains a shadow region and a non-shadow region (typically a shadow region appears in an image of a sunny day), the contrast for the entire image is high. Accordingly, the machine learning approach is effective for detecting the shadow region of the image. By contrast, if the contrast of the image is low (e.g., few shadow regions appear in an image of a cloudy day), the shadow detection based on the machine learning approach may produce an inaccurate outcome.

In the following embodiments, a discriminating step in which images not taken on the sunny day (i.e., cloudy day or rainy day) are filtered out is provided before a classifying step in which the shadow and non-shadow regions of the images are classified. Since the mages not taken on the sunny day generally include few shadows, it may not be necessary to segment the image into two, namely, a shadow region and non-shadow region to independently carry out white balance processing on the two regions. Scenes identifying and classifying technologies often include complex texture characteristic amounts such as a directional histogram and a local binary pattern. Such characteristic amounts are considered to be too complex to be computed by the hardware environment of a camera.

In view of the hardware processing capacity of digital cameras and the requirement for white balance processing, the supplied image is divided into blocks of the same size, shadow detection is carried out on each block, and the digital camera in the following embodiments incorporates hardware to measure the mean brightness and color value of the blocks of a certain size.

SUMMARY OF THE INVENTION

Accordingly, embodiments of the present invention may provide a novel and useful device and method for detecting shadows in images solving one or more of the problems discussed above.

According to an aspect of the embodiments, a device for detecting a shadow region in an image includes an imaging module configured to generate a first multi-channel image including a brightness channel, a red channel, a green channel, and a blue channel; a brightness correcting module configured to correct values of the brightness channel of the first multi-channel image based on imaging parameters utilized in the imaging module, and to output the corrected first multi-channel image as a second multi-channel image; a scene classifying module configured to determine whether a shadow detection is to be carried out on the second multi-channel image based on a characteristic value computed based on the second multi-channel image; a shadow detecting module configured to classify each pixel of the second multi-channel image on which it is determined that the shadow detection is to be carried out by the scene classifying module into a shadow pixel or a non-shadow pixel, and to generate a first shadow classification mark matrix in which each pixel has a shadow classification mark value corresponding to the classification of the shadow and non-shadow pixel; a region segmentation module configured to segment the first multi-channel image generated by the imaging module into a plurality of regions each having a set of pixels having similar color values, and to generate a region mark matrix in which each pixel has a region mark value corresponding to the region and the pixels belonging to the same region have the same region mark value; and a post-processing module configured to update the first shadow classification mark matrix based on the first shadow classification mark matrix generated from the shadow detecting module and the region mark matrix output from the region segmentation module, and to output the updated first shadow classification mark matrix as a second shadow classification mark matrix.

According to another aspect of the embodiments, a method for detecting a shadow region in an image includes the steps of: generating a first multi-channel image including a brightness channel, a red channel, a green channel, and a blue channel; correcting values of the brightness channel of the first multi-channel image based on imaging parameters utilized in the generating step, and outputting the corrected first multi-channel image as a second multi-channel image; determining whether a shadow detection is to be carried out on the second multi-channel image based on a characteristic value computed based on the second multi-channel image; classifying each pixel of the second multi-channel image on which it is determined that the shadow detection is to be carried out in the determining step into a shadow pixel or a non-shadow pixel, and generating a first shadow classification mark matrix in which each pixel has a shadow classification mark value corresponding to the classification of the shadow and non-shadow pixel; segmenting the first multi-channel image generated in the generating step into a plurality of regions each having a set of pixels having similar color values, and generating a region mark matrix in which each pixel has a region mark value corresponding to the region and the pixels belonging to the same region have the same region mark value; and updating the first shadow classification mark matrix based on the first shadow classification mark matrix generated in the segmenting step, and outputting the updated shadow classification mark as a second shadow classification mark matrix.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention as claimed.

BRIEF DESCRIPTION OF THE DRAWINGS

FIG. 3 includes examples illustrating brightness L and color values R, G, B of the image with low resolution corresponding to the image illustrated in FIG. 2;

FIG. 7B is a diagram illustrating an example of a $std_{BR}$ characteristic of a histogram of the image taken on a cloudy day;

FIG. 10 is a flowchart illustrating region segmenting processing;

FIG. 12C is a diagram illustrating an updated shadow classification mark matrix output from a post-processing module.

DETAILED DESCRIPTION OF THE PREFERRED EMBODIMENTS

A description is given below, with reference to the FIGS. 1 through 12 of embodiments of the invention.

Figure 1:
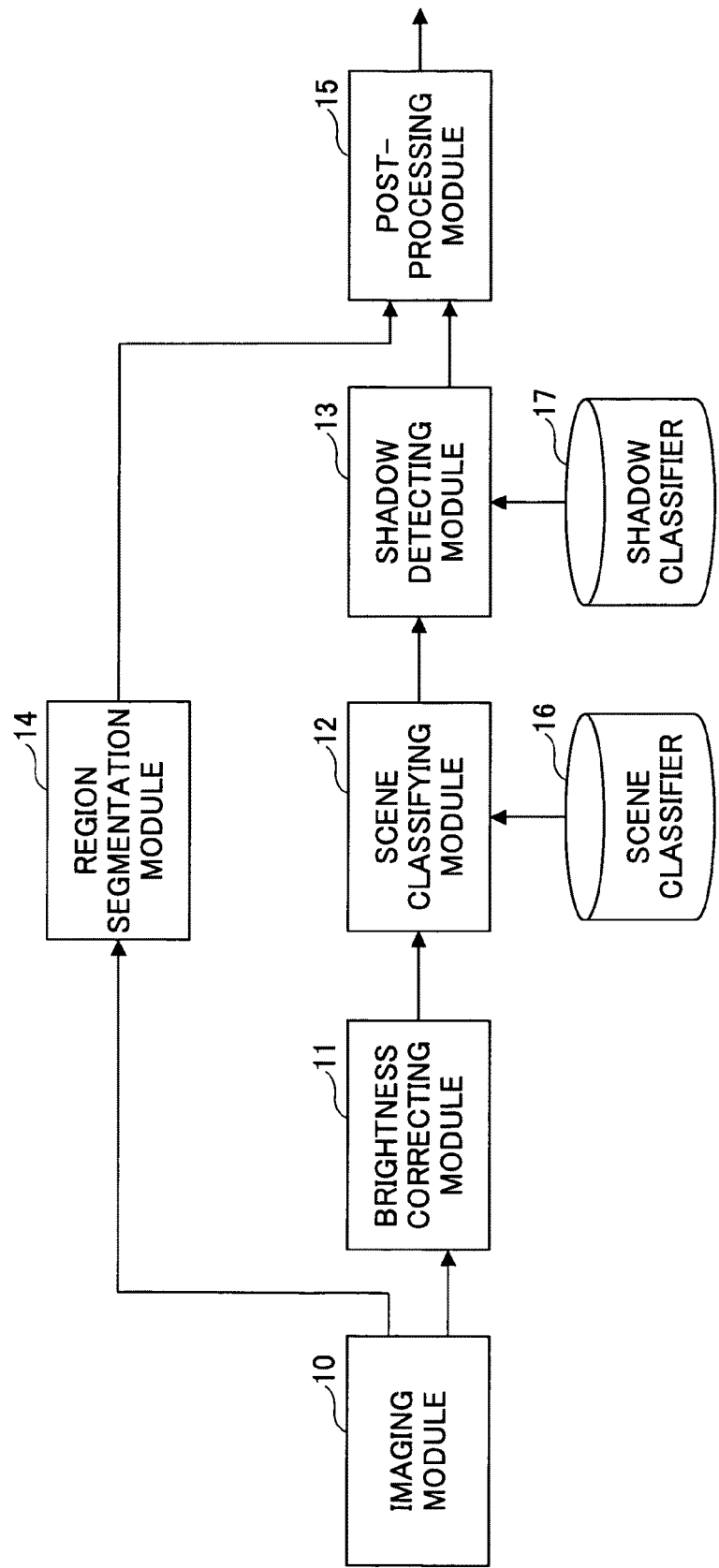
FIG. 1 is a block diagram illustrating a shadow detection device according to an embodiment of the invention.

As illustrated in FIG. 1, a shadow detection unit according to an embodiment of the invention includes an imaging module 10, a brightness correcting module 11, a scene classifying module 12, a shadow detecting module 13, a region segmentation module 14, a post-processing module 15, a scene classifier 16 containing scene class data, and a shadow classifier 17 containing shadow class data. The imaging module 10 generates image signals when photographing a scene with a camera. The brightness correcting module 11 corrects the image signals generated by the imaging module 10 based on imaging parameters such as exposure time, sensitivity (ISO value), and numerical aperture (F value) to obtain an accurate measurement value of the brightness of the image. The scene classifying module 12 utilizes the scene examples of the scene classifier 16 to determine whether shadow detection processing is required for the generated image signals. That is, the scene classifying module 12 filters the image data that contain few shadows (i.e., images taken on a cloudy or rainy day). The shadow detecting module 13 utilizes the shadow examples of the shadow classifier 17 to segment pixels of the image that may contain shadows into two types of pixels, namely, shadow pixels and non-shadow pixels. The region segmentation module 14 segments the image signals generated by the imaging module 10 into plural regions. The pixels in the divided regions have approximate color values. The post-processing module 15 combines a result from the region segmentation module 14 with a result from the shadow detecting module 13 to provide shadow and non-shadow attributes to the two types of pixels having the respective approximate color values.

Figure 2:
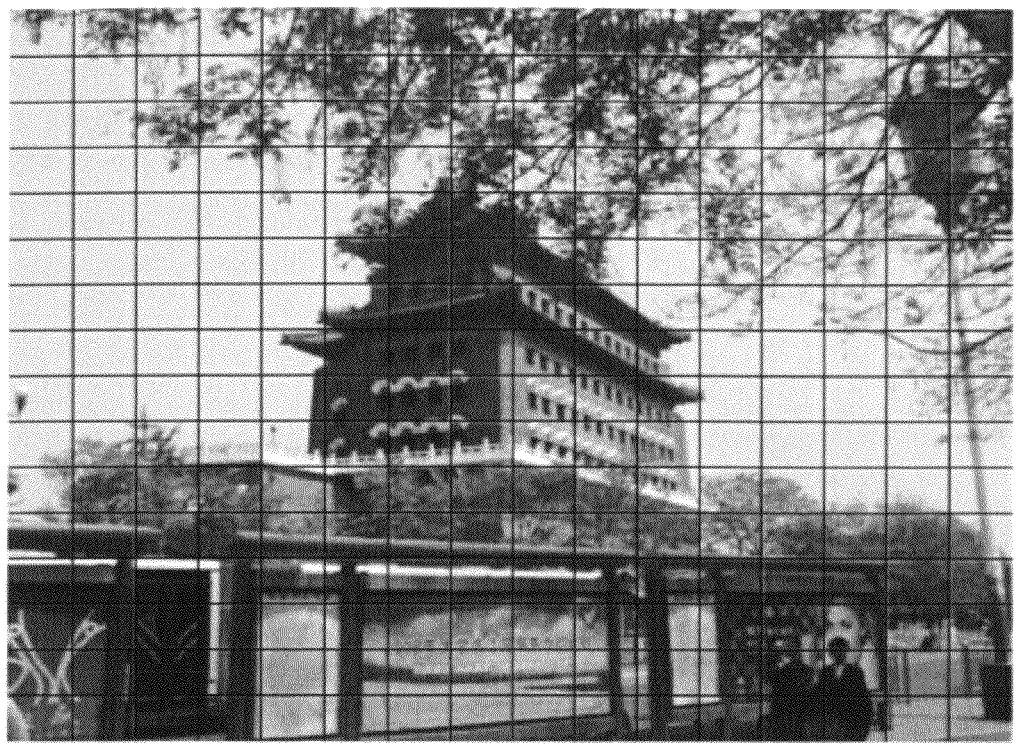
FIG. 2 is an example of an image equally sectioned into 16*16 pixel blocks.
Figure 3:
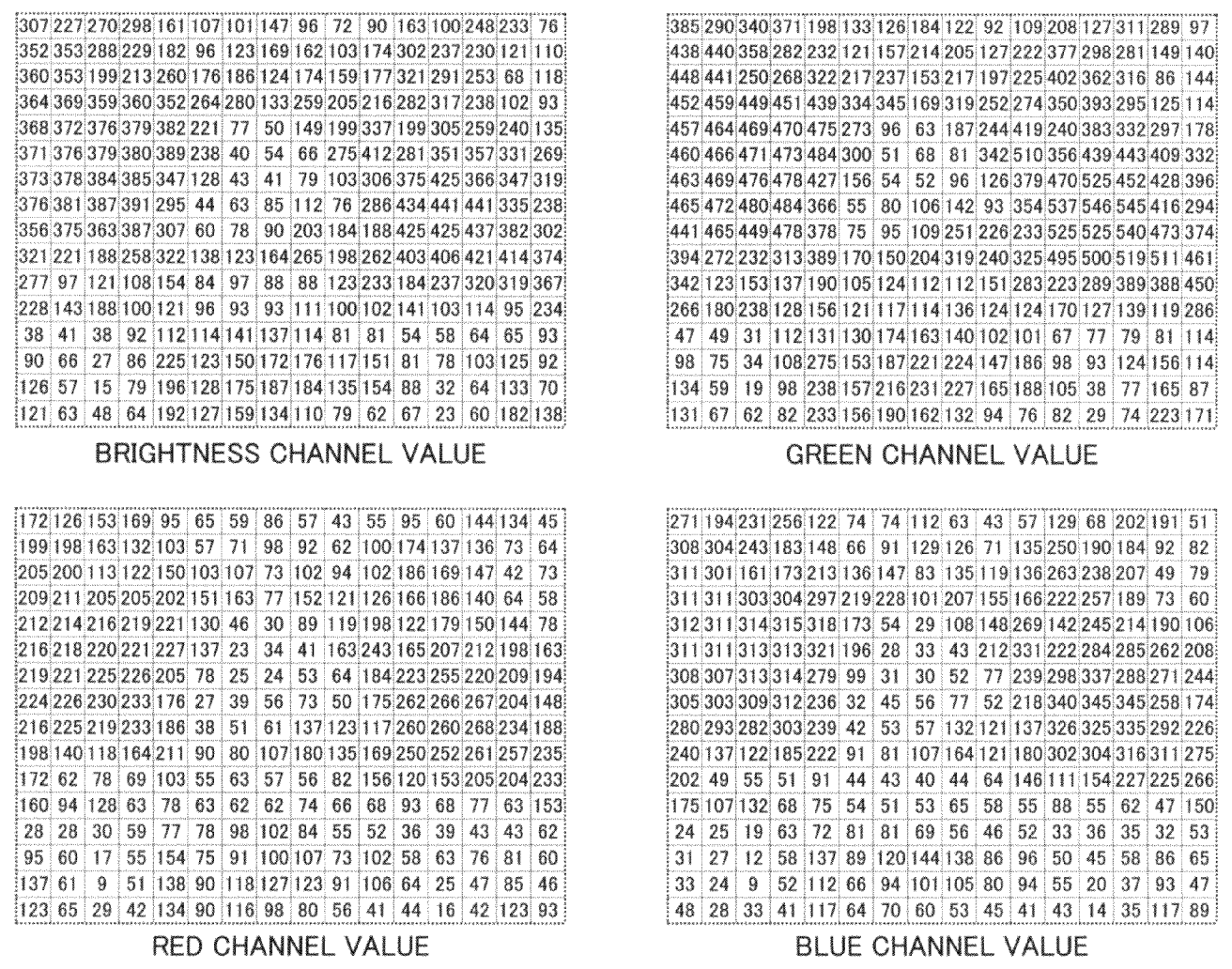

The image forming module 10 generates image signals subject to shadow detection. The image signals subject to shadow detection may constitute a full-size photograph (generally includes several million pixels). However, since the white balance processing is carried out in real time with shadow detection, the resolution of the image subject to the shadow detection may be low. In the following embodiments, the resolution of the image signals to be used may be 16*16 pixels, which corresponds to a block of 204*153 pixels relative to a full-size image of several hundreds pixels. FIG. 2 illustrates a full-size image. FIG. 3 illustrates images subject to shadow detection including four channels of brightness, red, green and blue, the channels corresponding to the full-size image of FIG. 2. The signals of the low resolution image may be acquired from the hardware of the camera in real time, or may be obtained from the finally formed full size image by computing the mean of the corresponding blocks of the image. If the signals are obtained in the latter manner, the brightness channel value L is computed by assigning a red channel value R, a green channel value G, and a blue channel value B to the following equation (2).

$$L = \frac{R + 2G + B}{4} \quad (2)$$

Alternatively, the red channel value R, the green channel value G, or the blue channel value B may be directly assigned to the brightness channel value L. That is, L=R, L=G, or L=B.

The imaging parameters of the camera affect the brightness of the image signals generated by the imaging module 10. In photographic theory, the brightness L is affected by the exposure time (e), ISO value (iso), and numerical aperture (F value). The brightness correcting module 11 corrects the brightness L of the supplied image signals based on the following equation (3).

$$L_c = L \cdot \frac{e_{ref}}{e} \cdot \frac{iso_{ref}}{iso} \cdot \left(\frac{F}{F_{ref}}\right)^2 \quad (3)$$

In equation (3), L and $L_c$ respectively represent the brightness before correcting the image signals and the brightness after correcting the image signals; e, iso, and F respectively represent the exposure time, ISO value, and numerical aperture while $e_{ref}$, $iso_{ref}$ and $F_{ref}$ represent reference values corresponding to the exposure time, ISO value, and numerical aperture. In the embodiment, $e_{ref}$=1/200, $iso_{ref}$=200, and $F_{ref}$=4 may be used. The coefficient k may be added to equation (3) as illustrated in the following equation (3-1) without affecting the embodiment.

$$L_c = k \cdot L \cdot \frac{e_{ref}}{e} \cdot \frac{iso_{ref}}{iso} \cdot \left(\frac{F}{F_{ref}}\right)^2 \quad (3\text{-}1)$$

The brightness module 11 may correct the brightness L based on one or two of the e, iso, and F, as illustrated in the following equation (3-2).

$$L_c = L \cdot \frac{e_{ref}}{e} \cdot \left(\frac{F}{F_{ref}}\right)^2 \quad (3\text{-}2)$$

Figure 4:
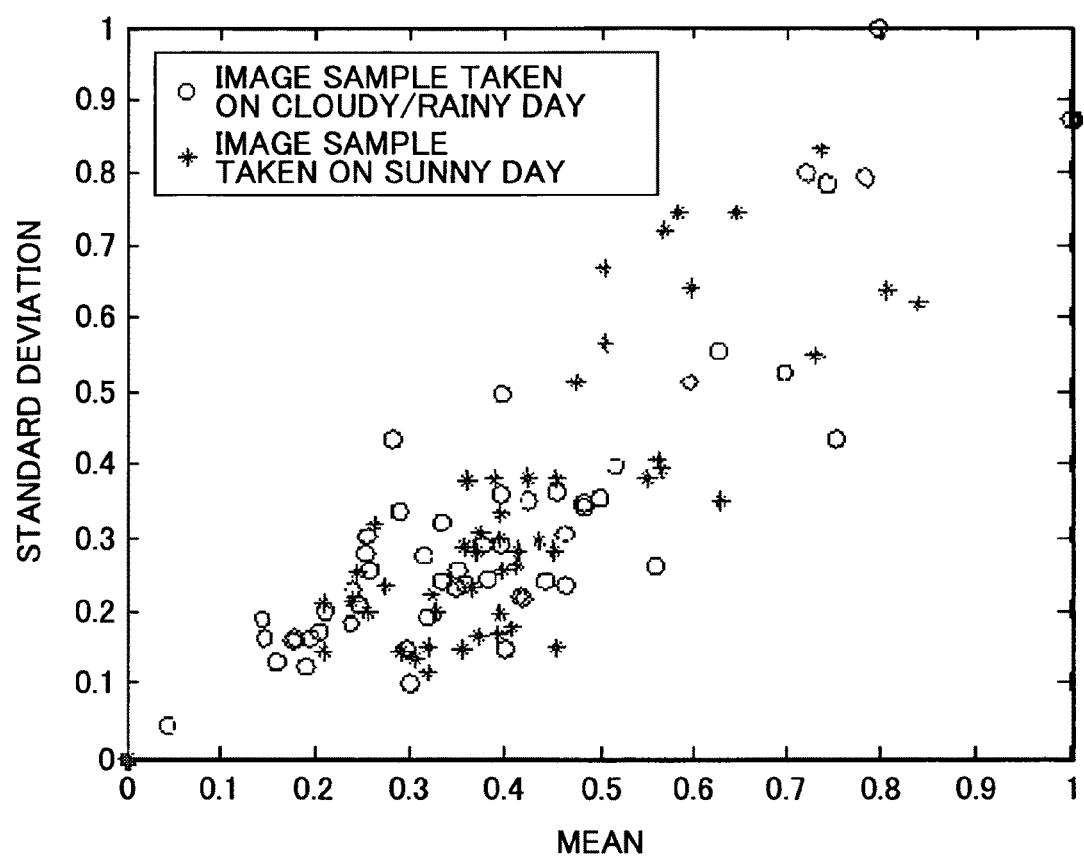
FIG. 4 is a graph illustrating distributions of the mean and the standard deviation of the brightness L and color values R, G, B of two image samples taken on a sunny day and a cloudy day in a case where brightness of the image is not corrected.
Figure 5:
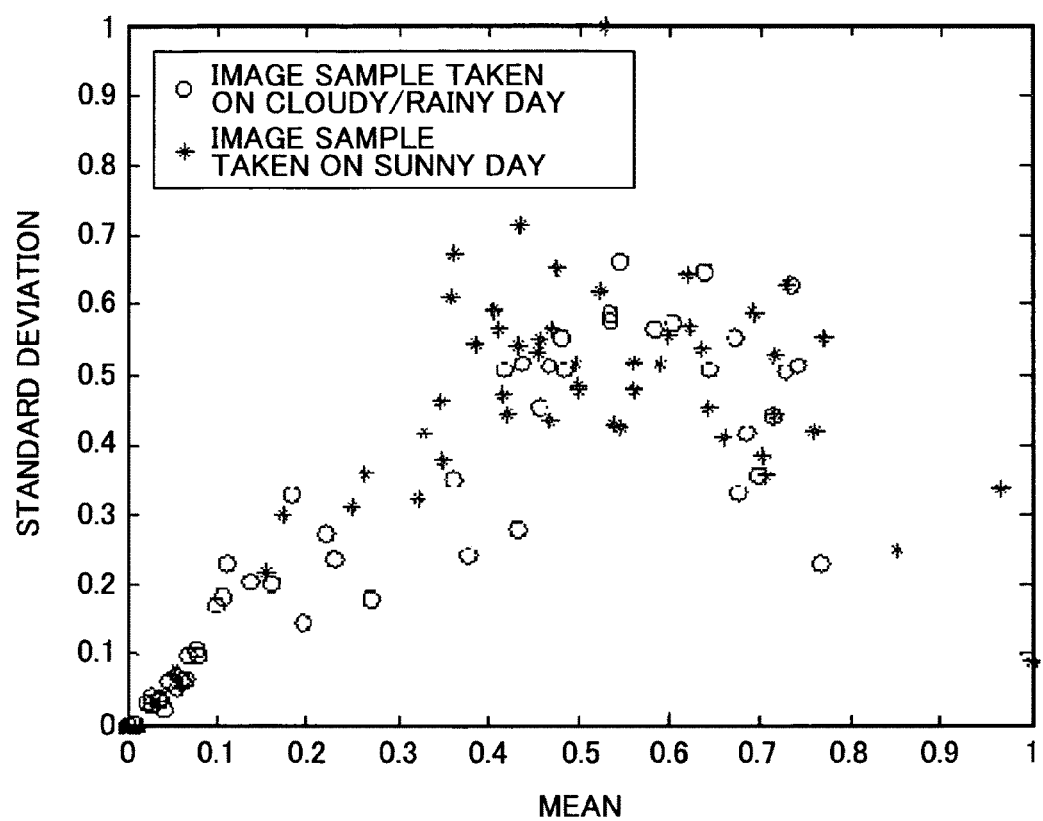
FIG. 5 is a graph illustrating distributions of the mean and the standard deviation of the brightness L and color values R, G, B of two image samples taken on a sunny day and a cloudy day in a case where brightness of the image is corrected.

The effect of the brightness correction may be obtained by analyzing the difference in the distributions of the brightness between the image signals with correction and those without correction. For example, two images taken on a sunny day and in a cloudy or rainy day are prepared and the mean and the standard deviation of the brightness of the pixels in the images are computed. Empirically, the image taken on a cloudy day generally exhibits low brightness and low contrast (i.e., small standard deviation) compared to the image taken on a sunny day. FIG. 4 is a diagram illustrating distributions of the mean and standard deviation of the brightness of the two images taken on a sunny day and in a cloudy or rainy day, where "○" represents an image sample taken on a cloudy or rainy day and "*" represents an image taken on a sunny day. In this distribution diagram, the two types of samples are not clearly discriminated as expected. This results from the fact that the camera provides certain compensation to the brightness of the entire images by automatically adjusting e, iso, and F values, so that the boundary line between the two images has become unclear. FIG. 5 is a diagram illustrating distributions of the mean and standard deviation of the brightness of the two images. In this distribution diagram, the two types of samples are clearly discriminated.

The scene classifying module 12 selects the images that may require shadow detection. The scene classifying module 12 is configured to include a first input module to input a post-correction multi-channel image, a first characteristic computation module to compute a mean and a standard deviation of a brightness channel value of the post-correction multi-channel image as a first characteristic and a second characteristic, a BR matrix computation module to compute, based on the post-correction multi-channel image, a ratio of a blue channel value (B amount) and a red channel value (R amount) to obtain a BR matrix, a second characteristic computation module to compute a standard deviation of the BR matrix as a third characteristic, and a confidence level computation module to input the first, the second, and the third characteristics to a scene classifier as a set of scene training data in advance to compute the confidence level. If the obtained confidence level exceeds a predetermined threshold, the input post-correction multi-channel image is output to the shadow detecting module to thereby carry out shadow detection processing on the output post-correction multi-channel image. By contrast, if the obtained confidence level does not exceed a predetermined threshold, the shadow detection processing is not carried out.

Figure 6:
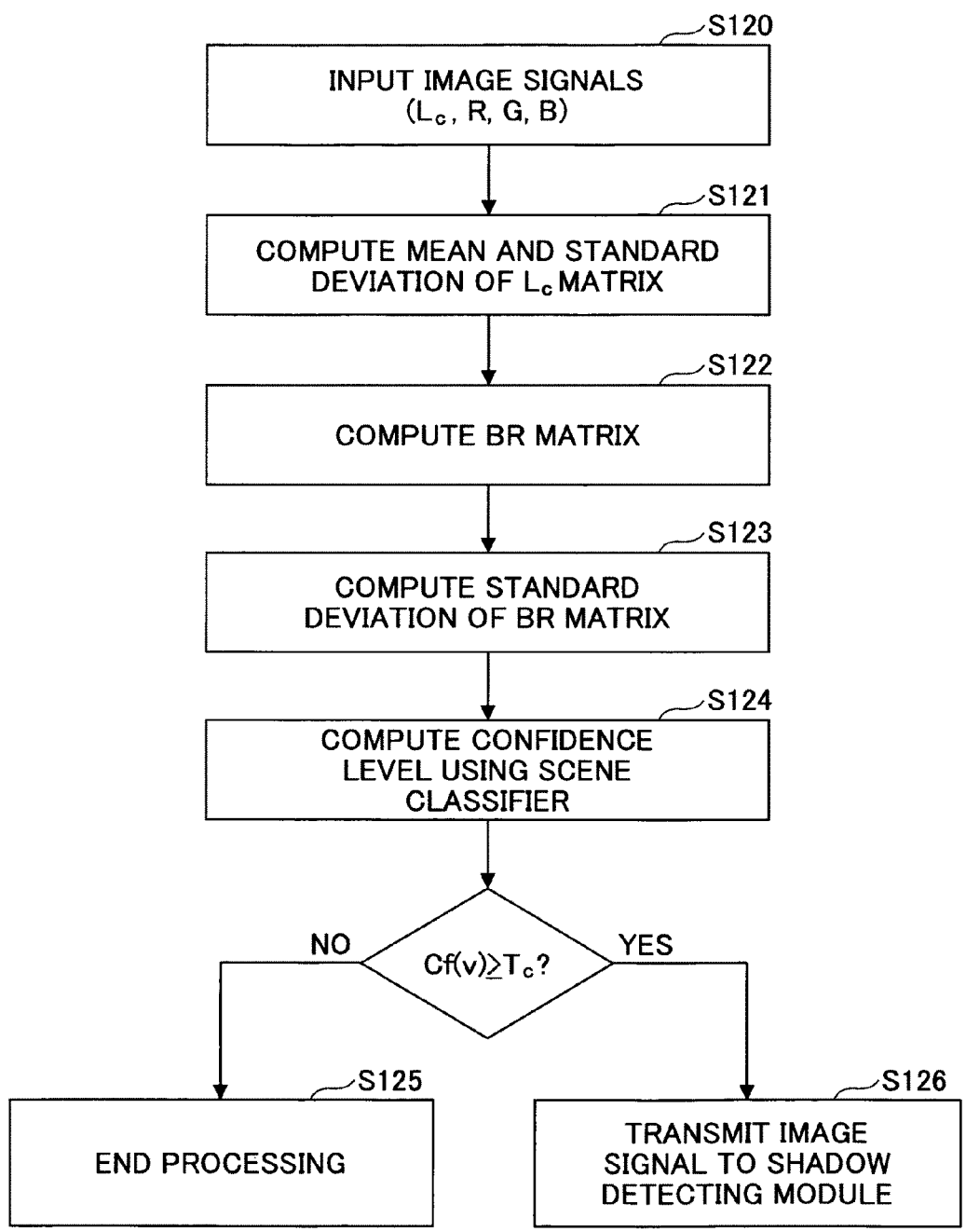
FIG. 6 is a flowchart illustrating scene classification processing.

FIG. 6 is a flowchart illustrating processing carried out by the scene classifying module 12. In step S120, the multi-channel image including four channel values of $L_c$, R, G, and B, each composed of a 16*16 pixel image matrix, is supplied. $L_c$ is a value corrected by the brightness correcting module 11. In step S121, the mean $m_L$ and the standard deviation $std_L$ of the brightness of the $L_c$ matrix are computed as the first and the second characteristics in scene classification. In step S122, another matrix is computed as a BR matrix based on the B matrix and the R matrix. Here, a value of the BR(i, j) is defined as a ratio of the B amount and the R amount to obtain the following equation (4). In equation (4), i and j indicate a row number and a column number, respectively.

$$BR(i,j)=B(i,j)/R(i,j) \quad (4)$$

Figure 7A:
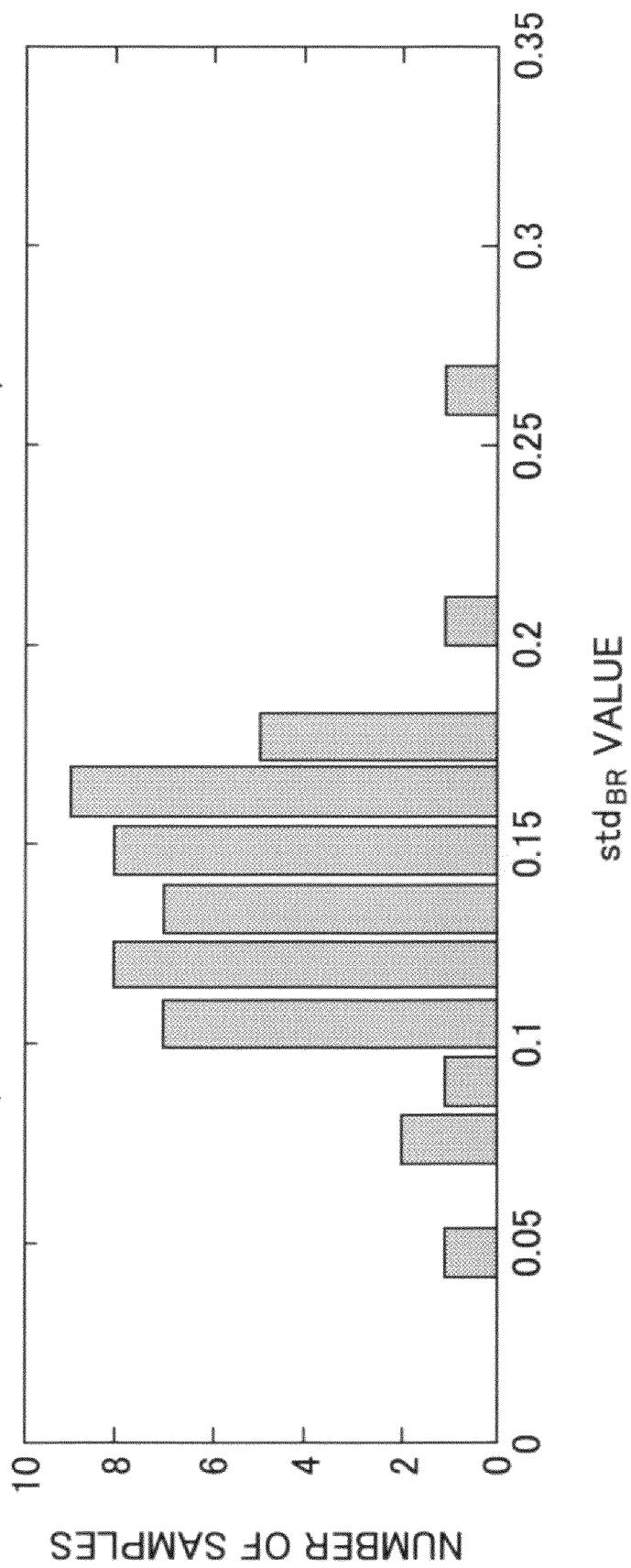
FIG. 7A is a diagram illustrating an example of a $std_{BR}$ characteristic of a histogram of the image taken on a sunny day.

In step S123, the standard deviation $std_{BR}$ of the BR matrix is computed as the third characteristic. The first, the second, and the third characteristics are optimal characteristics selected by experiment. In FIG. 5, the characteristics $m_L$ and $std_L$ may be factors that can identify two types of samples taken on a sunny day and in a cloudy day. FIGS. 7A and 7B illustrate histograms representing distributions of the std BR characteristics of the two types of samples. FIG. 7A indicates the histogram of the image taken on a sunny day and FIG. 7B indicates the histogram of the image taken on a cloudy day. As is made clear in FIGS. 7A and 7B, the image samples taken on a sunny day have a large $std_{BR}$ whereas the image samples taken on a cloudy day have a small $std_{BR}$. Accordingly, the images taken on a sunny day and those taken on a cloudy day may be identified based on the first, the second, and the third characteristics. The images taken on a sunny day and those taken on a cloudy day may be identified better based on a combination of the first, the second, and the third characteristics than based on one of the first, the second, and the third characteristics.

The classification boundary surface between the two types of image samples in the three-dimensional characteristic space are determined based on predetermined thresholds prepared by experience. More accurately, two sample groups each having a different one of the two types of images are acquired in advance, and the classification boundary surface may be obtained by a machine learning technique based on the two sample groups.

According to the embodiment, the classification boundary surface may be obtained by a support vector machine (SVM) technique. In a training phase, two sample groups are acquired. In the two sample groups, the sample group of positive examples includes images taken on a sunny day and the sample group of negative examples includes images taken on a cloudy day. A unique vector vi is computed corresponding to each sample image (number=i), which is represented by the following equation.

$$vi=\{m_L(i),std_L(i),std_{BR}(i)\} \quad (4\text{-}1)$$

In this equation (4-1), $m_L(i)$ and $std_L(i)$ respectively represent the mean and the standard deviation of the brightness of the ith sample, and $std_{BR}(i)$ represents the standard deviation of the BR matrix of the ith sample. In another embodiment, the images taken on a sunny day can be discriminated from those taken on a cloudy day based on the characteristics of $m_L$ and $std_L$, which is represented by the following equation (4-2).

$$vi=\{m_L(i),std_L(i)\} \quad (4\text{-}2)$$

There are n positive samples and m negative samples. If k=n+m, a vector group represented by "V={vi}, i=1 ... k" and a mark group represented by "Y={$y_i$}, i=1 ... k" are obtained. $y_i$ represents a classification mark of the sample corresponding to a unique vector vi and is defined by the following equation (5).

$$y_i = \begin{cases} 1 & v_i \text{ Negative Samples} \\ 0 & v_i \text{ Positive Samples} \end{cases} \quad (5)$$

In the support vector machine (SVM) technique, it may be necessary to select the kernel function K. In this embodiment, the Gaussian function indicated by the following equation (6) is employed as the kernel function K.

$$K(x1,x2)=\exp(-\|x1-x2\|_2^2/\sigma^2) \quad (6)$$

In equation (6), the parameter σ is a predetermined constant, an example of which may be σ=1.

Further, other functions may also be selected as the kernel function. For example, the linear function indicated by the following equation (6-1) may be selected as the kernel function.

$$K(x1,x2)=<x1,x2>+\epsilon \quad (6\text{-}1)$$

In equation (6-1), <x1, x2> represents an inner product of the vectors x1 and x2, and ε is a predetermined constant, an example of which may be ε=1.

In the training phase, a sub-group including nv vectors represented by "W={$w_i$}, 1 ... nv" is selected from the vector group V by support vector machine (SVM) algorithms. The sub-group is called a support vector group. In the support vector group represented by "W={$w_i$}, 1 ... nv", "$w_i$" is multiplied by the weight "$a_i$". As a result, a first classifier function fun1 is represented by the following equation (7).

$$\text{fun1}=(\bullet)=\Sigma_{i=1}^{nv} y_i a_i K(w_i,\bullet)+b \quad (7)$$

In equation (7), $y_i$ represents a classification mark corresponding to the vector $w_i$, and b represents a constant obtained by the training algorithm.

The support vector machine (SVM) algorithm is a well known technology in the machine learning field, and examples of such an SVM technology are disclosed in the Chinese translation version of "V. Vapnik, The nature of statistical learning theory, Spring-Verlag, New York, 1995".

The classifier function and parameters obtained by training are stored in the scene classifier 16.

In step S124, the confidence level Cf(v) of the vector v may be computed by the following equation (8) based on the first classifier function fun1 stored in the scene classifier 16.

$$Cf(v) = \frac{1}{1+\exp(-\text{fun1}(v))} \quad (8)$$

In equation (8), Cf is a value obtained within the confidence interval [0, 1]. The Cf is compared with a predetermined threshold $T_c$ by the following equation (9) to thereby obtain a classification mark yv of the supplied unique vector v.

$$y_v = \begin{cases} 1 & Cf(v) \geq T_c \\ 0 & Cf(v) < T_c \end{cases} \quad (9)$$

If $T_c$=0.5, the scene classifier 16 generates a prediction of the image taken on a sunny day and a prediction of the image taken on a cloudy day with the same probability y. That is, there is no bias between the two predictions. If $T_c$ exceeds 0.5, the scene classifier 16 generates a prediction biased toward "the image taken on a sunny day". If $T_c$ is equal to or lower than 0.5, the scene classifier 16 generates a prediction biased toward "the image taken on a cloudy day".

If the confidence level Cf is smaller than the threshold $T_c$, the image formed of the supplied image signals is determined as "the image taken on a cloudy day" which does not require the shadow detection processing, and the process moves to step S125 to end the process. If the confidence level Cf is equal to or larger than the threshold $T_c$, the image formed of the supplied image signals is determined as "the image taken on a sunny day" which may require the shadow detection processing, and the process moves to step S126 to transmit the image signals to the shadow detecting module 13.

The shadow detecting module 13 classifies the pixels of the supplied image into a shadow group and non-shadow group based on the color characteristic of the corresponding pixels. A shadow region of the image generally includes the following characteristics. That is, since brightness of the shadow obtained after correcting the brightness (i.e., post-correction brightness) is low, the value of $L_c$ is small, and the shadow appears bluish in the image. This indicates the image has a high proportion of blue color.

According to imaging characteristics of a camera, in general, the saturation of the background in the distance is low and the saturation of the scene in the vicinity is high. Thus, the saturation of the image may be one of the classification characteristics when the image of the scene in the vicinity is subjected to the shadow detection processing (i.e., normal white balance processing).

In the embodiment, the post-correction brightness $L_c$, the saturation S, and the ratio BR of the blue amount and the red amount are given as the three color characteristics. The supplied image signals include $L_c$, R, G, and B channel pixel values corresponding to the post-correction brightness, a red color component, a green color component, and a blue color component, and each channel is an image matrix composed of 16*16 pixels. Of a position (i,j) in the image, i and j respectively represent horizontal and vertical positions, and a unique vector P(i,j) is computed by the following equation (10) based on the above three color characteristics.

$$P(i,j)=[L_c(i,j),BR(i,j),S(i,j)] \quad (10)$$

In equation (10), $L_c(i,j)$ represents the post-correction brightness of a pixel at a position (i,j), and R(i,j), G(i,j), and B(i,j) represent R, G, and B values, respectively. The ratio BR(i,j) can be computed by the following equation (11), and the saturation S(i,j) can be computed by the following equation (12).

$$BR(i,j) = B(i,j)/R(i,j) \quad (11)$$

$$S(i,j) = 1 - \frac{3}{R(i,j)+G(i,j)+B(i,j)}[\min(R(i,j),G(i,j),B(i,j))] \quad (12)$$

The saturation S(i,j) may alternatively be computed by an equation differing from equation (12), an example of which is represented by the following equation (12-1).

$$S(i,j) = \begin{cases} 0, & \max = 0 \\ \frac{\max - \min}{\max}, & \text{Others} \end{cases} \quad (12\text{-}1)$$

In equation (12-1), max and min respectively represent the maximum value and the minimum value of the values of R(i,j), G(i,j), and B(i,j).

In another embodiment, unique vector P(i,j) may be computed based on the two color characteristics, that is, the post-correction brightness L and the saturation S, using the following equation (12-2).

$$P(i,j)=[L_c(i,j),S(i,j)] \quad (12\text{-}2)$$

Figure 8:
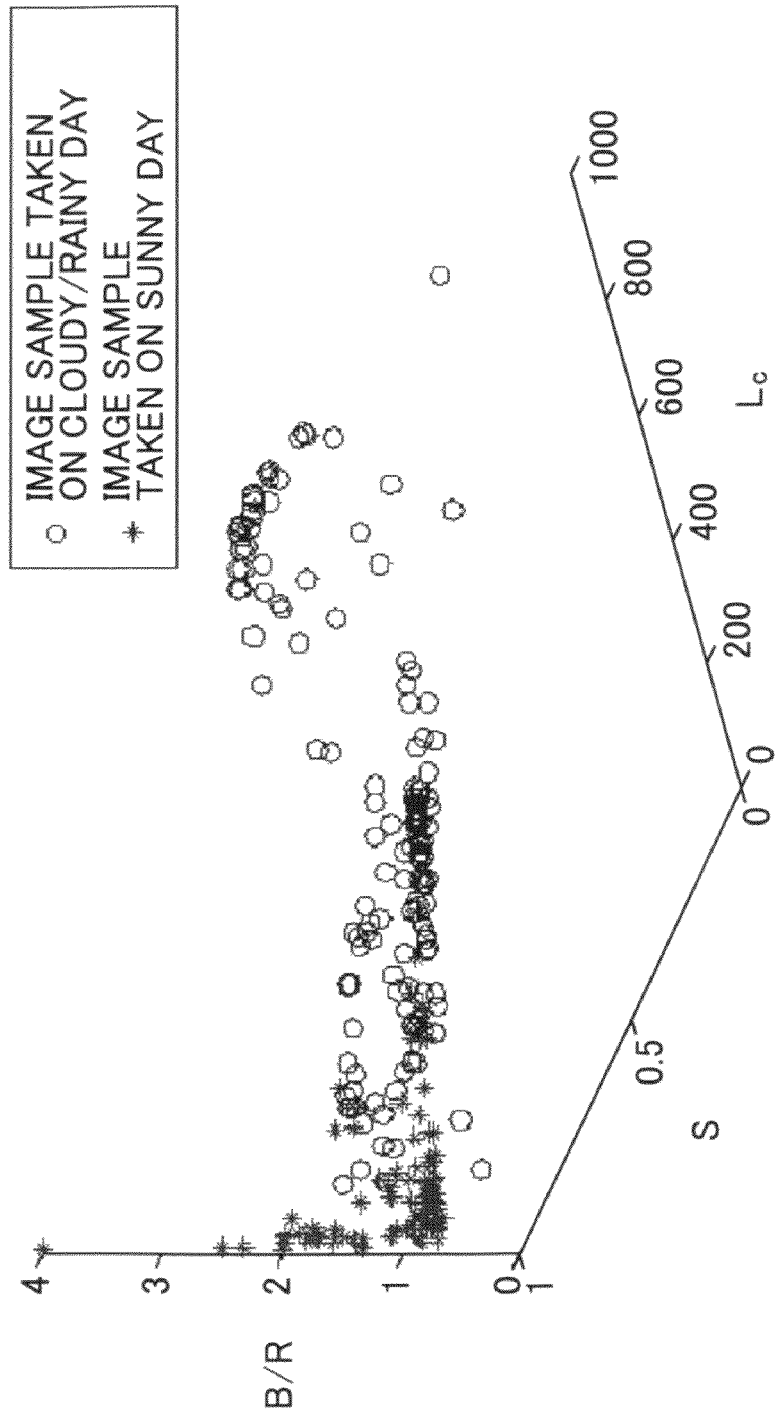
FIG. 8 is a diagram illustrating an example of three types of color characteristics of the shadow pixels and non-shadow pixels.

FIG. 8 illustrates distributions of three types of characteristic values of shadow pixels and non-shadow pixels. In FIG. 8, "*" and "○" respectively represent the shadow pixels and non-shadow pixels.

The shadow detecting module 13 includes a second input module to input a post-correction multichannel image, a third characteristic computation module to compute a unique vector corresponding to pixels of the post-correction multichannel image, and a shadow classification mark matrix computation module to compute a class of the pixels of the post-correction multichannel image to be a shadow class or a non-shadow class based on the unique vector computed by the third characteristic module and shadow classification data obtained by training that are stored in the shadow classifier, and generate a shadow classification mark matrix. In the shadow classification mark matrix, a pixel determined as belonging to a shadow class is provided with a first mark value, and a pixel determined as belonging to a non-shadow class is provided with a second mark value.

Figure 9:
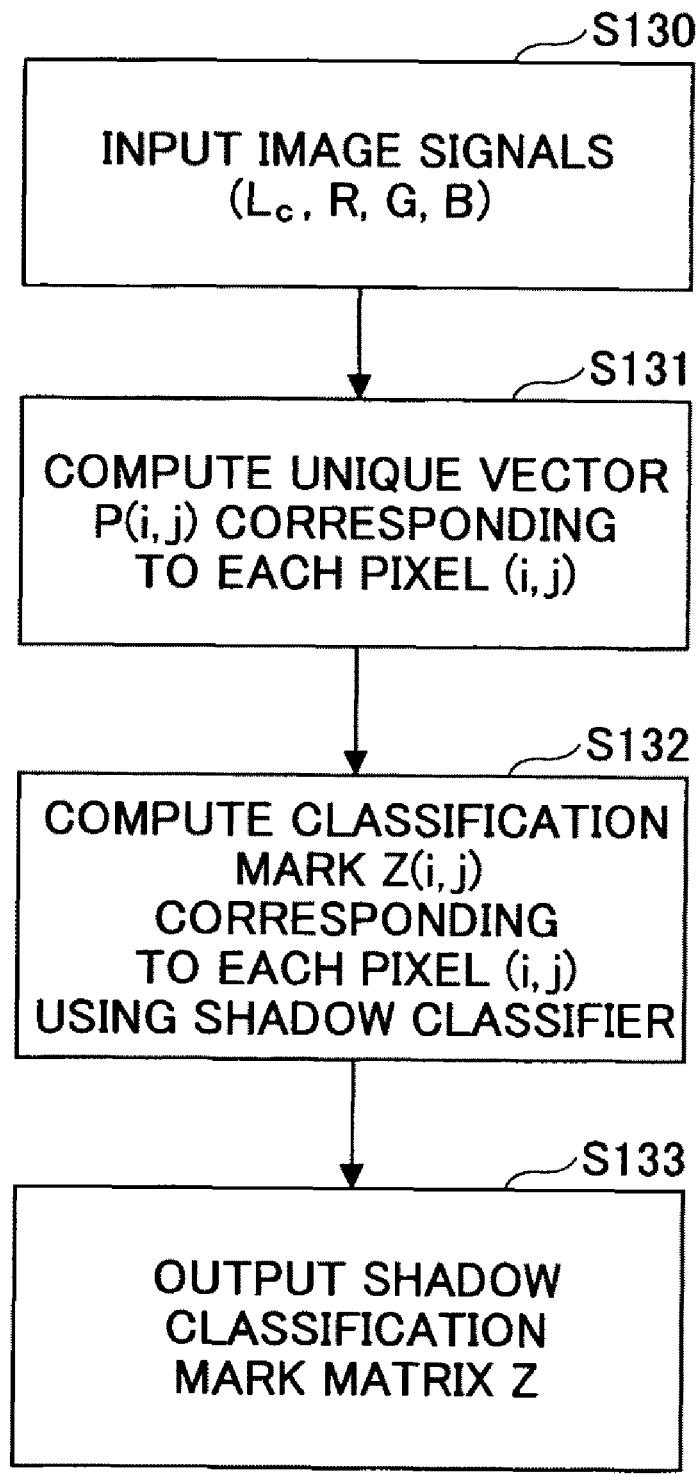
FIG. 9 is a flowchart illustrating shadow detection processing.

FIG. 9 is a flowchart illustrating processing carried out by the shadow detecting module 13. In step S130, image signals supplied are acquired. In step S131, a unique vector P (i,j) is computed by equations 10 through 12 for the pixels (i,j) of the supplied image. In step S132, an attribute (shadow or non-shadow) of each of the pixels is predicted based on the shadow classifying function stored in the shadow classifier 17. A classification mark Z (i,j) is provided to each of the pixels (i,j), where a value of 1 indicates the shadow class and a value of 0 indicates the non-shadow class. In step S133, a shadow classification mark matrix Z is output.

Similar to the scene classifier, the support vector machine (SVM) technology disclosed in the Chinese translation version of "V. Vapnik, The nature of statistical learning theory, Spring-Verlag, New York, 1995" is used to create shadow class data of the shadow classifier 17. The shadow class data of the shadow classifier 17 are created by a second classifier function fun2 represented by the following equation (13).

$$\text{fun2}(\bullet)=\sum_{i=1}^{my}y_{si}a_{si}K_s(f_i,\bullet)+b_s \quad (13)$$

In equation (13), my represents the number of support vectors of the shadow classifier obtained during a training process, $f_i$ represents a support vector, $y_{si}$ a classification mark (e.g., 1=shadow, 0=non-shadow) corresponding to the support vector $f_i$, and $a_{si}$ and $b_s$ represent parameters obtained in the training process. $K_s$ represents a kernel function utilized for the shadow classifier. According to the embodiment, $K_s$ is defined as a Gaussian function represented by the following equation (14).

$$K_s(x1,x2)=\exp(-\|x1-x2\|_2^2/\sigma_s^2) \quad (14)$$

In equation (14), $\sigma_s$ is a predetermined constant, an example of which may be $\sigma_s$=1.

Other functions may also be selected as the kernel function. For example, the linear function represented by the following equation (14-1) may be selected as the kernel function.

$$K_s(x1,x2)=<x1,x2>+\epsilon \qquad (14\text{-}1)$$

In equation (14-1), <x1, x2> represents an inner product of the vectors x1 and x2, and $\epsilon$ is a predetermined constant, an example of which may be $\epsilon=1$.

In step S132, the classification mark Z(i, j) of the pixel (i,j) is computed by the following equation (15), based on the second classifier function fun2 represented by equation (13) stored in the shadow classifier 17.

$$Z(i, j) = \begin{cases} 1 & \text{fun2}(P(i,\ j)) \geq 0 \\ 0 & \text{fun2}(P(i,\ j)) < 0 \end{cases} \qquad (15)$$

In equation (15), P(i,j) represents a unique vector corresponding to the pixel (i,j). If the classification mark Z(i, j) is 1, the pixel (i,j) belongs to a shadow class, whereas if the classification mark Z (i, j) is 0, the pixel (i, j) belongs to a non-shadow class.

However, the scene classifying module 13 may output a wrong classification. For example, if the sky area of the image appears bluish and is low in brightness, the scene classifying module 13 classifies it as a shadow class. In general, pixels located nearby having mutually approximately the same color in space belong to the same class of the shadow or non-shadow. The region segmentation module 14 segments the image into plural regions, in each of which the pixels have analogous color values. The post-processing module 15 improves an outcome of the shadow detection by combining an output from the shadow detecting module 13 with a result from the region segmentation module 14.

The post-processing module 15 includes a third input module to input a shadow classification mark matrix generated by the shadow detecting module 13, a fourth input module to input a region mark matrix generated by the region segmentation module 14, and a shadow classification mark updating module to compute a number of first elements N0 including a first mark value and a number of second elements N1 including a second mark value of a region of the shadow classification mark matrix corresponding to each region of the region mark matrix, and update all the first or all the second elements of the shadow classification mark matrix with the first or the second mark values.

FIG. 10 is a diagram illustrating an example of a sequence of instructions for region segmenting processing carried out by the region segmentation module 14. First, a region mark matrix M having the same size as that of the supplied image is provided, in which each element of the region mark matrix M is made corresponding to a pixel of the supplied image. The elements of the region mark matrix M are initialized to zero. A variable C is provided for recording the region mark provided to a divided region currently obtained. The C is initialized to zero.

In the segmenting step, each element (x,y) of the region mark matrix M is sequentially classified. If M(x,y)=0, the value of the M(x,y) is applied to the current mark (variable) C, and the element (x,y) incorporates adjacent elements by extending from the obtained (x,y) as a starting point. Here, an incorporating requirement of adjacent pixels (elements) is represented by the following equation (16).

$$|L(x_0,y_0)-L(x_i,y_i)|<d \qquad (16)$$

In equation (16), d represents a predetermined threshold. When the extension (incorporation) of the pixels starting from the element (x,y) is completed, the element (x,y) incorporates adjacent elements located close to the element (x,y) and having approximately the same brightness as the element (x,y) to form a region. Accordingly, the elements (i.e., pixels) in the region have the same region mark value.

After region mark values are provided with all the elements in the region mark matrix M, the image is divided into $C_T$ regions (i.e., $C_T$ indicates the number of regions), that is, the elements of the image form $C_T$ regions. The $C_T$ is the final value of the variable C obtained after completing the steps of the processing in FIG. 10.

Figure 11:
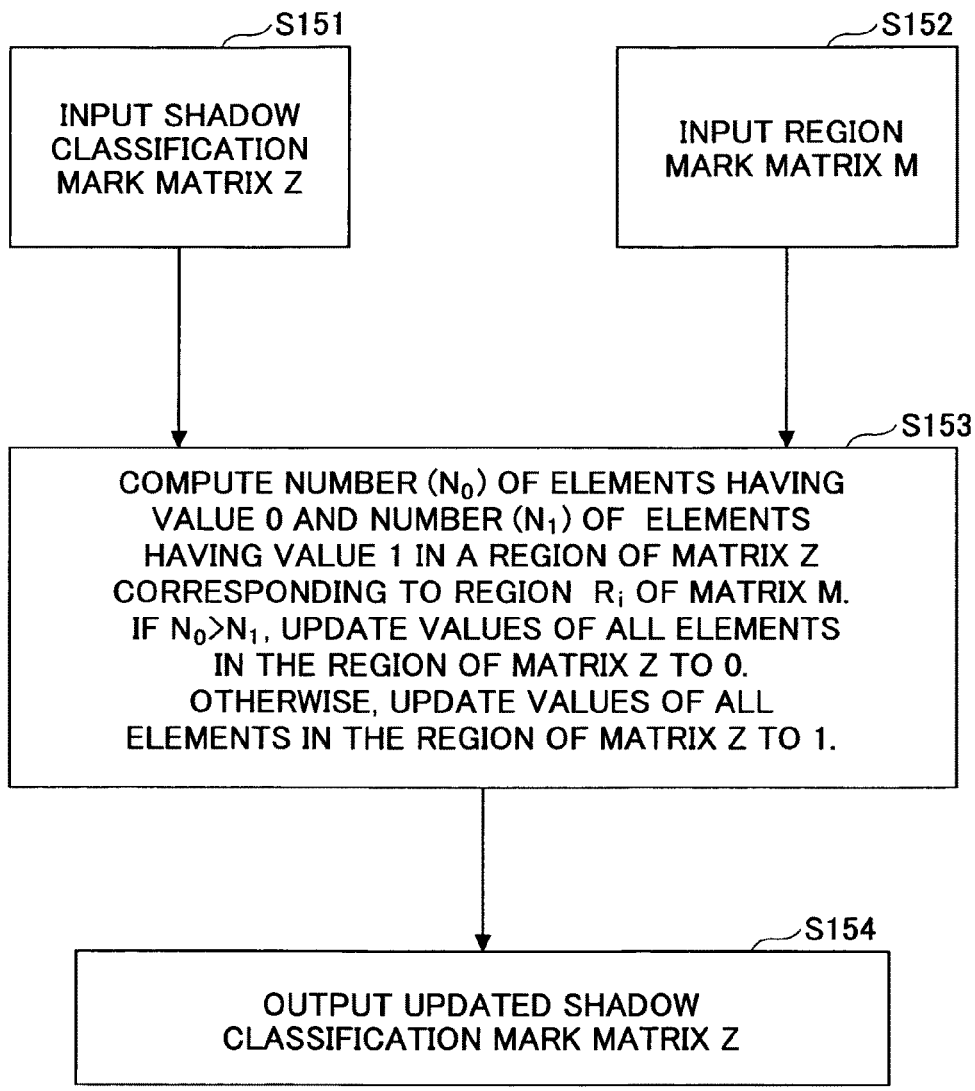
FIG. 11 is a flowchart illustrating processing in a post-processing module.

FIG. 11 is a flowchart illustrating post-processing. In step S151, the shadow classification mark matrix Z output from the shadow detecting module 13 is supplied. Here, "1" and "0" respectively represent a shadow pixel and a non-shadow pixel. In step S152, a region mark matrix M output from the region segmentation module 14 is supplied. The mark matrix M includes $C_T$ regions differing from one another. In step S153, the number of elements having values of 1 (marked as $N_1$) and the number of elements having values of 0 (marked as $N_0$) in a region of the shadow classification mark matrix Z corresponding to the region $R_i$ (i is a reference value ranging from 1 through $C_T$) marked with $C_i$ of the region mark matrix M are computed. If $N_0>N_1$, the values of the elements in the region of the shadow classification mark matrix Z corresponding to the region $R_i$ of the region mark matrix M are set to zero, and if not, the values of the elements in the are set to 1. In step S154, an updated shadow classification mark matrix Z' is output as a final outcome of the shadow detection.

Figures 12A, 12B:
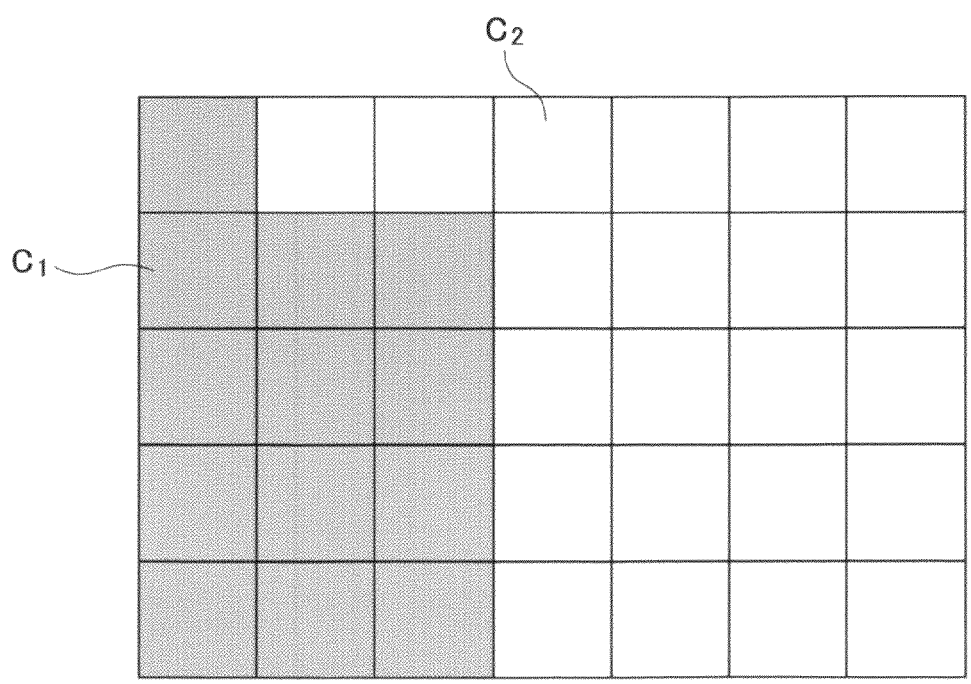
FIG. 12A is a diagram illustrating a shadow classification mark matrix output from a shadow detecting module.
FIG. 12B is a diagram illustrating a region mark matrix output from a region segmentation module.

FIGS. 12A through 12C illustrate an example of the post-processing. FIG. 12A illustrates the shadow classification mark matrix Z output from the shadow detecting module 13. FIG. 12B illustrates the region mark matrix M output from the region segmentation module 14. In FIG. 12B, a gray region represents a first region $C_1$ and a white region represents a second region $C_2$. FIG. 12C illustrates an updated shadow classification mark matrix Z'. In the above-described post-processing, all the elements corresponding to the $C_1$ region are set to zero, and all the elements corresponding to the $C_2$ region are set to 1.

According to the embodiment, the processed image is composed of 16*16 pixels; however, the number of pixels forming the image may easily be varied for those skilled in the art by selecting a suitable number of pixels according to the hardware of the imaging module 10 and the actual requirements (e.g., time).

A sequence of operations described above may be implemented by hardware, software, or a combination of hardware and software. If the sequence of operations is implemented by software, the computer readable programs of the operations can be installed in a built-in memory in specialized hardware, thereby causing a computer to execute the installed computer programs. Such computer programs may also be executed by an applied computer capable of executing various processes in which the computer programs are installed.

For example, such computer programs may be stored in a recording medium such as hardware or ROM in advance, or may be temporarily or permanently stored in a removable recording medium such as a FD, a CD-ROM, an MO, a DVD, a disk, and a semiconductor memory. These removable recording media may be provided as package software.

The embodiments may be combined with the disclosed related art technology to provide a combined technology in which whether supplied images are taken indoor or outdoor is determined in advance and then shadows are detected in the images taken indoor.

According to the embodiments, brightness of an image can be corrected based on imaging parameters such as sensitivity, numerical aperture, and exposure time, and whether the supplied image has been taken on a sunny day can be predicted utilizing a classifier including data on the corrected brightness and color characteristics. Further, the shadow detection may also be improved by providing the post-processing operation based on the divided regions of the image. A unique classifying attribute is provided with each of the divided regions of the image.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the preferred embodiments of the present invention have been described in detail, it should be understood that various changes, substitutions, and alterations could be made hereto without departing from the spirit and scope of the invention.

This patent application is based on Chinese Priority Patent Application No. 200910126541 filed on Mar. 12, 2009, the entire contents of which are hereby incorporated herein by reference.

What is claimed is:

1. A device for detecting a shadow region in an image comprising:
    an imaging module configured to generate a first multi-channel image including a brightness channel, a red channel, a green channel, and a blue channel;
    a brightness correcting module configured to correct values of the brightness channel of the first multi-channel image based on imaging parameters utilized in the imaging module, and to output the corrected first multi-channel image as a second multi-channel image;
    a scene classifying module configured to determine whether a shadow detection is to be carried out on the second multi-channel image based on a characteristic value computed based on the second multi-channel image;
    a shadow detecting module configured to classify each pixel of the second multi-channel image on which it is determined that the shadow detection is to be carried out by the scene classifying module into a shadow pixel or a non-shadow pixel, and to generate a first shadow classification mark matrix in which each pixel has a shadow classification mark value corresponding to the classification of the shadow and non-shadow pixel;
    a region segmentation module configured to segment the first multi-channel image generated by the imaging module into a plurality of regions each having a set of pixels having similar color values, and to generate a region mark matrix in which each pixel has a region mark value corresponding to the region and the pixels belonging to the same region have the same region mark value; and
    a post-processing module configured to update the first shadow classification mark matrix based on the first shadow classification mark matrix generated from the shadow detecting module and the region mark matrix output from the region segmentation module, and to output the updated first shadow classification mark matrix as a second shadow classification mark matrix.

2. The device as claimed in claim 1, wherein the second multi-channel image is obtained by multiplying the values of the brightness channel of the first multi-channel image by a predetermined coefficient which is determined based on exposure time, numerical aperture, and sensitivity employed by the imaging module when the imaging module has taken the first multi-channel image.

3. The device as claimed in claim 1, wherein the scene classifying module classifies the second multi-channel image into a first type image including a sunny day image and a second type image including a cloudy day image based on the characteristic value computed based on the second multi-channel image, and determines that the shadow detection is to be carried out on the second multi-channel image when the second multi-channel image is classified into the first type image, and that the shadow detection is not to be carried out on the second multi-channel image when the second multi-channel image is classified into the second type image.

4. The device as claimed in claim 1, wherein in the scene classifying module, the characteristic value computed based on the second multi-channel image includes a mean and a standard deviation of values of the brightness channel of the second multi-channel image, and a standard deviation of ratios of values of the blue channel and values of the red channel of the second multi-channel image.

5. The device as claimed in claim 1, wherein the scene classifying module includes:
    a first input module configured to input the second multi-channel image;
    a first characteristic computation module configured to compute a mean and a standard deviation of values of the brightness channel of the second multi-channel image, and to output the mean and the standard deviation of the values of the brightness channel of the second multi-channel image as a first characteristic and a second characteristic, respectively;
    a BR matrix computation module configured to compute a ratio of a value of the blue channel and a value of the red channel for the pixels of the second multi-channel image to obtain a BR matrix;
    a second characteristic computation module configured to compute a standard deviation of the BR matrix, and to output the standard deviation of the BR matrix as a third characteristic; and
    a confidence level computation module configured to input the first, the second, and the third characteristics to a scene classifier to obtain the confidence level, and, if the computed confidence level exceeds a predetermined threshold, to transmit the second multi-channel image to the shadow detecting module so as to perform the classification on the second multi-channel image, and, if the computed confidence level is equal to or lower than a predetermined threshold, not to transmit the second multi-channel image to the shadow detecting module so as not to perform the classification.

6. The device as claimed in claim 1, wherein the shadow detecting module includes:
    a second input module configured to input the second multi-channel image;
    a third characteristic computation module configured to compute a unique vector of each of the pixels of the second multi-channel image; and
    a shadow classification mark matrix computation module configured to compute whether each pixel of the second multi-channel image is a shadow class or a non-shadow class based on the unique vector computed by the third characteristic computation module and a shadow classifier, and to generate the first shadow classification mark matrix in which the pixel classified as the shadow class has a first mark value and the pixel classified as the non-shadow class has a second mark value.

7. The device as claimed in claim 6, wherein the unique vector includes values of the brightness channel of the second multi-channel image, a ratio of a value of the blue channel and a value of the red channel, and a value of saturation of the second multi-channel image.

8. The device as claimed in claim 1, wherein the region segmentation module segments the first multi-channel image into the plurality of regions based on the values of the brightness channel of the first multi-channel image.

9. The device as claimed in claim 1, wherein the post-processing module includes:
 a third input module configured to input the first shadow classification mark matrix generated by the shadow detecting module;
 a fourth input module configured to input the region mark matrix generated by the region segmentation module; and
 a shadow classification mark update module configured to compute a number of elements having a first mark value and a number of elements having a second mark value in a corresponding region of the first shadow classification mark matrix with respect to the respective regions of the region mark matrix, to update the all elements in the corresponding region of the first shadow classification mark matrix with either one of the first mark value and the second mark value based on the obtained number of the elements having the first mark value and the obtained number of the elements having the second mark value, and to output the updated first shadow classification mark matrix as the second shadow classification mark matrix.

10. A method for detecting a shadow region in an image comprising the steps of:
 generating a first multi-channel image including a brightness channel, a red channel, a green channel, and a blue channel;
 correcting values of the brightness channel of the first multi-channel image based on imaging parameters utilized in the generating step, and outputting the corrected first multi-channel image as a second multi-channel image;
 determining whether a shadow detection is to be carried out on the second multi-channel image based on a characteristic value computed based on the second multi-channel image;
 classifying each pixel of the second multi-channel image on which it is determined that the shadow detection is to be carried out in the determining step into a shadow pixel or a non-shadow pixel, and generating a first shadow classification mark matrix in which each pixel has a shadow classification mark value corresponding to the classification of the shadow and non-shadow pixel;
 segmenting the first multi-channel image generated in the generating step into a plurality of regions each having a set of pixels having similar color values, and generating a region mark matrix in which each pixel has a region mark value corresponding to the region and the pixels belonging to the same region have the same region mark value; and
 updating the first shadow classification mark matrix based on the first shadow classification mark matrix generated in the segmenting step, and outputting the updated shadow classification mark as a second shadow classification mark matrix.

11. The method as claimed in claim 10, wherein the second multi-channel image is obtained by multiplying the values of the brightness channel of the first multi-channel image by a predetermined coefficient which is determined based on exposure time, numerical aperture, and sensitivity employed in the generating step when the first multi-channel image is imaged.

12. The method as claimed in claim 10, wherein in the determining step, the second multi-channel image is classified into a first type image including a sunny day image and a second type image including a cloudy day image based on the characteristic value computed based on the second multi-channel image, and the shadow detection is determined to be carried out on the second multi-channel image when the second multi-channel image is classified into the first type image, and the shadow detection is determined not to be carried out on the second multi-channel image when the second multi-channel image is classified into the second type image.

13. The method as claimed in claim 10, wherein in the determining step, the characteristic value computed based on the second multi-channel image includes a mean and a standard deviation of values of the brightness channel of the second multi-channel image, and a standard deviation of ratios of values of the blue channel and values of the red channel of the second multi-channel image.

14. The method as claimed in claim 10, wherein the determining step includes:
 inputting the second multi-channel image;
 computing a mean and a standard deviation of values of the brightness channel of the second multi-channel image, and outputting the mean and standard deviation of the values of the brightness channel of the second multi-channel image as a first characteristic and a second characteristic, respectively;
 computing a ratio of a value of the blue channel and a value of the red channel for the pixels of the second multi-channel image to obtain a BR matrix;
 computing a standard deviation of the BR matrix, and outputting the standard deviation of the BR matrix as a third characteristic; and
 inputting the first, the second, and the third characteristics to a scene classifier to obtain the confidence level, and, if the computed confidence level exceeds a predetermined threshold, transmitting the second multi-channel image to a shadow detecting module so as to perform the classification on the second multi-channel image, and, if the computed confidence level is equal to or lower than a predetermined threshold, not transmitting the second multi-channel image so as not to perform the classification.

15. The method as claimed in claim 10, wherein the classifying step includes:
 inputting the second multi-channel image;
 computing a unique vector of each of the pixels of the second multi-channel image; and
 computing whether each of the pixels of the second multi-channel image is a shadow class or a non-shadow class based on the unique vector computed in the computing the unique vector step and a shadow classifier, and generating the first shadow classification mark matrix in which the pixel classified as the shadow class has a first mark value and the pixel classified as the non-shadow class has a second mark value.

16. The method as claimed in claim 15, wherein the unique vector includes values of the brightness channel of the second multi-channel image, a ratio of a value of the blue channel and a value of the red channel, and a value of saturation of the second multi-channel image.

17. The method as claimed in claim 10, wherein in the segmenting step, the first multi-channel image is segmented into the plurality of regions based on the values of the brightness channel of the first multi-channel image.

18. The method as claimed in claim 10, wherein the updating step includes:
inputting the first shadow classification mark matrix generated in the classifying step;
inputting the region mark matrix generated in the segmenting step; and
computing a number of elements having a first mark value and a number of elements having a second mark value in a corresponding region of the first shadow classification mark matrix with respect to the respective regions of the region mark matrix, updating the all elements in the corresponding region of the first shadow classification mark matrix with either one of the first mark value and the second mark value based on the obtained number of the elements having the first mark value and the number of the elements having the second mark value, and outputting the updated first shadow classification mark matrix as a second shadow classification mark matrix.

\* \* \* \* \*